Feb. 1, 1966     L. B. DONKLE, JR     3,232,640
MULTI-WALL FLEXIBLE CONNECTOR WITH INTERPLY PRESSURIZATION
Filed Sept. 14, 1960     2 Sheets-Sheet 1
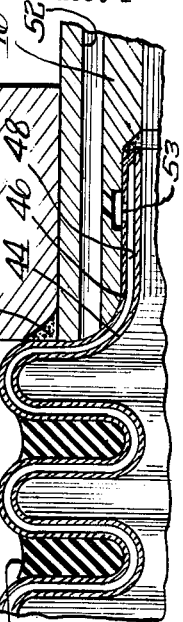
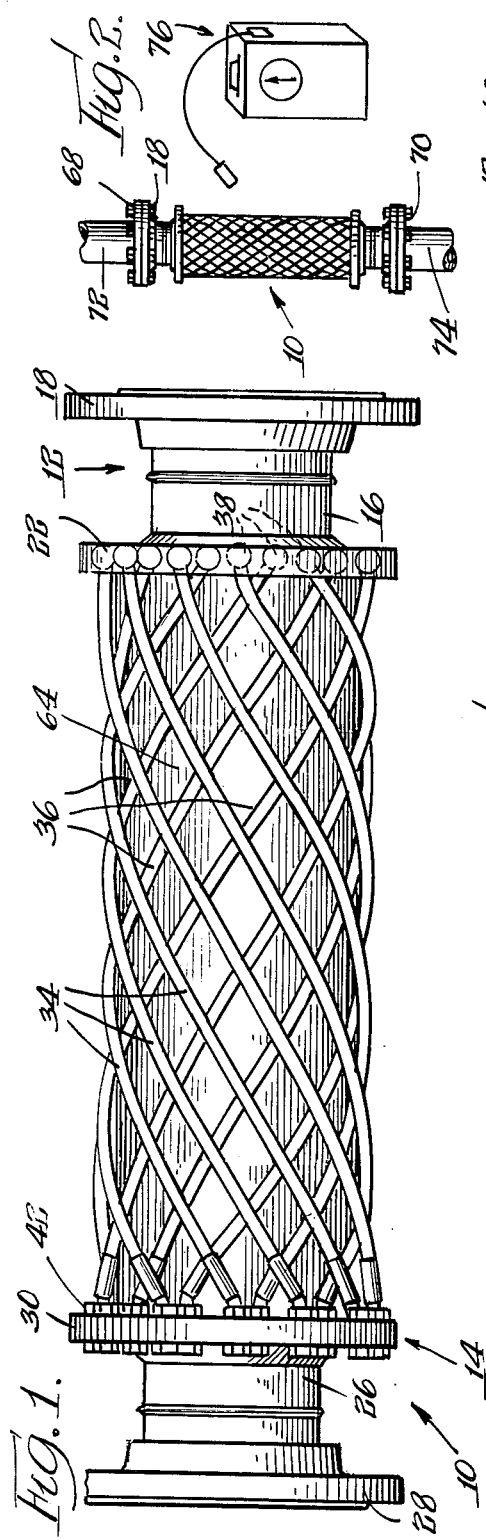
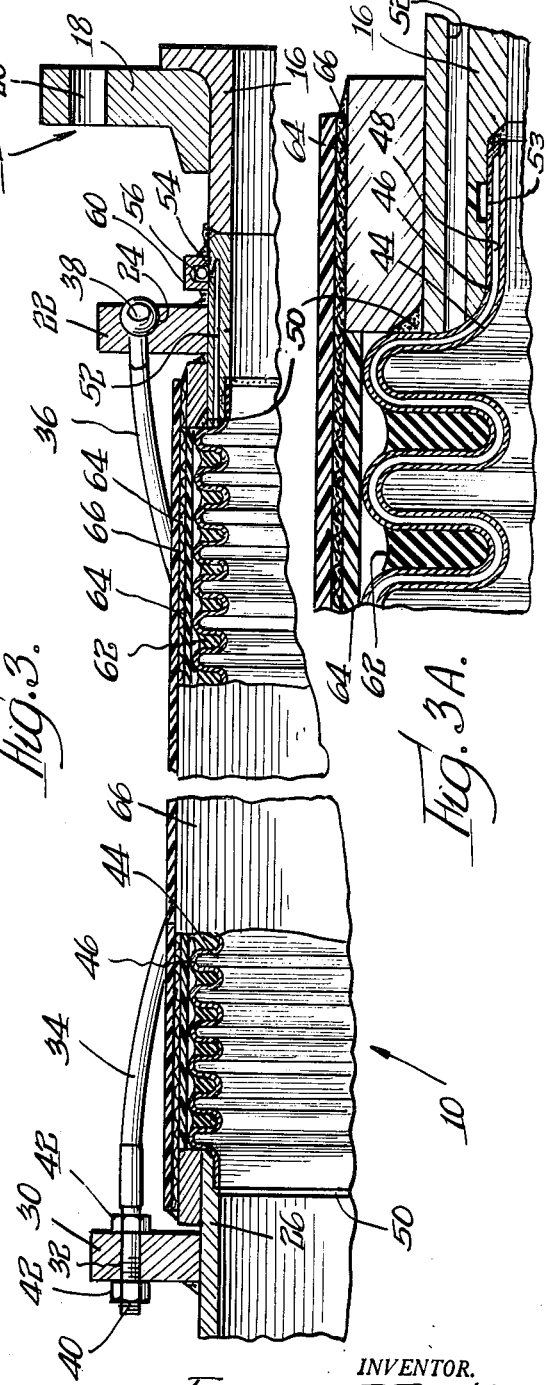
INVENTOR.
Lucius B. Donkle, Jr
BY
Olson & Trexler
Atty.

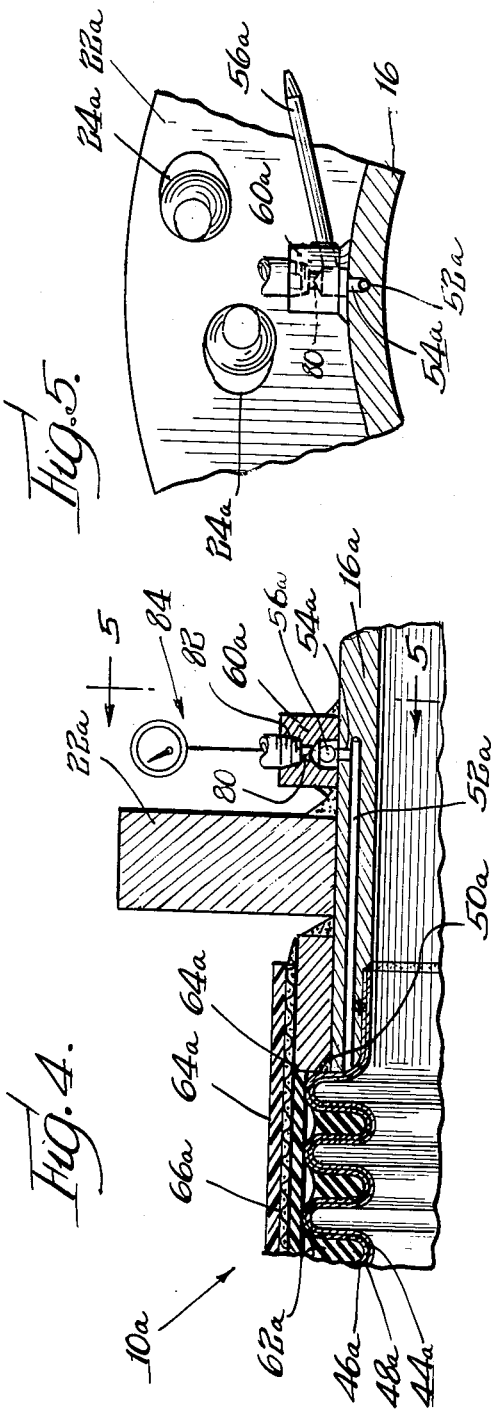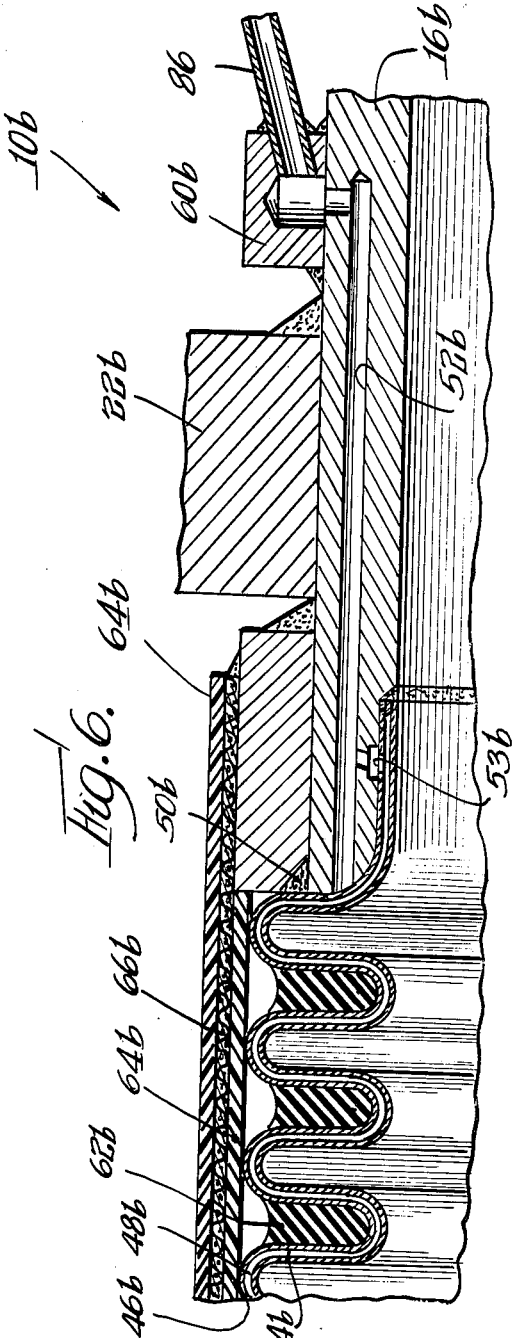

United States Patent Office 3,232,640
Patented Feb. 1, 1966

3,232,640
MULTI-WALL FLEXIBLE CONNECTOR WITH INTERPLY PRESSURIZATION
Lucius B. Donkle, Jr., Elgin, Ill., assignor, by mesne assignments, to Calumet & Hecla, Inc., Chicago, Ill., a corporation of Michigan
Filed Sept. 14, 1960, Ser. No. 55,995
2 Claims. (Cl. 285—93)

This invention relates generally to the art of tubing and more particularly to flexible connectors made of corrugated metal tubing.

In one aspect, the present invention relates to tubing of the multi-wall type and wherein provision is made for monitoring the space between the walls to determine failure of either or both of the walls in anticipation of the failure of the complete unit.

Another aspect of the invention concerns tubing of the multi-wall type wherein the interply region is subjected to fluid pressure whereby to control loading on the respective tube walls and whereby to lengthen use-life.

A further aspect and object of the invention involves flexible connectors made up of tubing of the multi-wall type and wherein the connector is subjected to substantial vibrational stress possibly accompanied by radial deflection of the opposite ends as well as substantial axial, tensile stress.

Therefore, a general object of the present invention is to provide novel means for indicating the failure in any of the flexible tubes of a multi-wall tubing system.

Another important object of the invention is to provide a new and improved flexible connector of the type comprising a multiplicity of flexible tubes surrounding each other.

Yet another object of the invention is to provide a flexible connector which affords an indication of the failure of any of the flexible tubes.

Still another object of the invention is to provide a tubing system in which the pressure stresses in the tubes can be selectively varied.

A further object of the invention is to provide a tubing system which exhibits prolonged use-life.

A still further object of the invention is to provide a flexible connector which is arranged to damp mechanical energy waves.

And a still further object of the invention is to provide a flexible connector which minimizes any repetitive contact between the tubes under conditions of vibration.

A yet further object of the invention is to provide a flexible connector of the type comprising a multiplicity of flexible tubes surrounding one another, secured between confronting end flanges and having axially disposed tension accommodating cables, the cables being arranged automatically to take the proper angle relative to the end flanges.

And a yet further object of the invention is to provide a flexible connector in which friction between the reinforcing cables and the flexible tubing is minimized.

Additional objects and features of the invention pertain to the particular structure, materials and arrangements whereby the above objects are attained.

The invention, both to its structure and mode of operation, will be better understood by reference to the following disclosure and drawings forming a part thereof, wherein:

FIG. 1 is a side-elevational view of a flexible connector constructed in accordance with the invention;

FIG. 2 is a view in reduced scale of the flexible connector of FIG. 1 assembled, by way of examples, in a piping system utilizing large diameter pipe, the view illustrating use of a leak detection apparatus for sensing failure in the outermost flexible tube;

FIG. 3 is an enlarged, fragmentary view partially in cross-section of the flexible connector of FIG. 1;

FIG. 3A is a further enlarged, cross-sectional view showing attachment of the tubes to an end flange assembly;

FIG. 4 is a fragmentary cross-sectional view of a modified embodiment of the invention showing attachment of the flexible tubes to one of the end flanges and showing means for monitoring the annular space between the tubes;

FIG. 5 is a view taken through the section 5—5 of FIG. 4; and

FIG. 6 is an enlarged view of a further modified embodiment of the invention illustrating means for continuously supplying pressurized fluid to the space between the flexible tubes.

Referring now in detail to the drawings, specifically to FIG. 1, a flexible connector indicated generally by the numeral 10 will be seen to include a pair of end flange assemblies, assembly 12 and assembly 14, which assemblies are spaced-apart to have corrugated, flexible tubes sealed therebetween. The end flange assembly 12 comprises a cable nipple 16 having a joint flange 18 securely fastened adjacent one end, flange 18 being provided with arcuately spaced apertures 20, shown in FIG. 3, for cooperatively passing bolts which secure the end flange assembly 12 to the cooperatively flanged end of a pipe in a piping system. It is recognized that types of end connectors other than nipples and flanges can be equally well employed.

Adjacent the other end of cable nipple 16, there is affixed a cable flange 22; and returning for the moment to FIG. 3, the cable flange 22 will be seen provided with a number of spherical sockets 24 for purposes to become apparent hereinafter.

End flange assembly 14 is constructed similarly to end flange assembly 12, specifically including a cable nipple 26, a joint flange 28 and a cable flange 30. With reference to FIG. 3, the cable flange 30 will be seen provided with a number of longitudinally extending bores 32.

Tension accommodating cables, specifically cables 34 and 36 are disposed between the flanges 22 and 30. The cables 34 and 36 are similarly constructed with a swivel ball 38 secured to one end for cooperatively engaging a ball socket 24 and with a threaded stud 40 at the opposite end for entering a bore 32 to be coupled adjustably to flange 30 by means of cooperatively threaded nuts 42. While cables 34 and 36 are similarly comprised and advantageously include multi-strand wire cable, they are oppositely situated, as is shown in FIG. 1. There, cables 34 will be seen extending diagonally between the flanges 30 and 22 in one direction whereas cables 36 will be seen extending diagonally between the flanges 30 and 22 in a different direction. It is to be pointed out that the means coupling the cables to flange 30, specifically the studs 40 and nuts 42, permit individual adjustment of the tension in each of the cables 34 and 36 in order to achieve a stress balanced unit. It is also to be pointed out that ball and socket connections may be made at both ends of the cables, if desired.

With reference to FIGS. 3 and 3A, an inner, corrugated, flexible tube 44 and an outer, corrugated flexible metal tube 46 will be seen joined together at opposite ends in radially spaced, coaxial relationship in order to define a closed annular space 48, the tubes 44 and 46 being joined at their opposite ends as by means of brazed joints. In addition, the joined flexible tubes 44 and 46 are sealed between end flange assemblies 12 and 14, as for example by having their joined ends sealed to the cable nipples 16 and 26 respectively using brazings 50 or other suitable means.

In accordance with an important feature of the invention, the annular space 48 between tubes 44 and 46 is evacuated or is filled with a fluid exerting superatmospheric pressure; and in order to evacuate or fill this fluid into the space 48, cable nipple 16 is provided with a channel 52, shown in FIG. 3A, which is aligned with an aperture 53 in outer tube 46 at one end and which, as is shown in FIG. 3, communicates through a bore 54 with a filling capillary 56 positioned adjacent the other end of channel 52. Advantageously, a block 60 is welded to the exterior periphery of cable nipple 16 for mounting the capillary tube 56. Capillary tube 56 is connected to a vacuum pump or to a suitable source of fluid under pressure, not shown; and after appropriate evacuation or after appropriate quantities of the fluid have been introduced into the space 48, tube 56 may be severed from its connection with the source and hermetically sealed.

In compliance with another feature of the invention, the external corrugations in outer flexible tube 46 are substantially filled with an elastomeric material 62 in order to damp mechanical energy waves, especially vibratory mechanical energy waves. Compositions based on silicone and chloroprene-type rubbers have proved eminently suitable for the elastomeric material 62. Furthermore, filling the external corrugations of flexible tube 46 approximately 75% full has developed acceptable damping in specific embodiments of the invention.

Continuing with reference to FIGS. 3 and 3A and in accordance with another important feature of the invention polytetrafluoroethylene resin pressure sensitive tape 64 is wrapped about the flexible tubes over and under a braided sleeve 66 which surrounds the flexible tubes between cable flanges 22 and 30. Moreover, the cables 34 and 36 are advantageously coated or jacketed with polytetrafluoroethylene resin tubing or pressure sensitive tape in cooperation with the wrapping of sleeve 66. These coverings reduce friction between the cables and the exterior of the braided sleeve 66 and between the sleeve 66 and the outer flexible tube 46.

Having thus described one construction of the invention, it is important now to describe use of the illustrated embodiment in a specific environment. In FIG. 2, the flexible connector 10 is shown connected in a piping system, specifically between the flanged ends 68 and 70 of two large diameter pipes, pipes 72 and 74 respectively. However, it is realized that the invention is applicable to many situations and is not limited to this specific environment.

Assuming that pipes 72 and 74 and connector 10 are carrying a material under a high pressure and that normal atmospheric pressure surrounds the connector 10, the fluid charged into space 48 will, in accordance with one important aspect of the invention, be arranged to exert a pressure intermediate of atmospheric pressure and the pressure inside pipes 72 and 74. Thus, a reduction in pressure interply pressure, as sensed for example by a pressure-sensitive switch, will indicate failure of the outer tube, tube 46, and an increase in interply pressure will indicate failure of the inner tube, tube 44.

Assuming, on the other hand, that fluid has been charged into the space 48 between the flexible tubes in the assembly of connector 10 and that this fluid is specifically dichloro-difluoro-methane, indication of leakage of the outer ply or tube 46 can readily be achieved by monitoring the exterior of the connector 10 with a halogen leak detecting apparatus 76. Indication of a failure of the inner ply or tube 44 can be achieved by monitoring the media flowing through pipes 72 and 74 with similar detecting apparatus.

This determination of failure in either of the plies or tubes is particularly useful when each of the tubes is arranged to be sufficiently strong to contain the pressure in the piping system independently, i.e., where the multiplicity of tubes is provided for purposes of establishing a safety factor. Under these circumstances, indication of failure in one of the tubes signals need for replacement of the flexible connector but permits continued operation of the piping system at full capacity for at least a short period of time.

Under certain circumstances, it may be desirable to vary the pressure stresses in the two flexible tubes, and this may be achieved by selection of the pressure to which the fluid in the annular space 48 is raised. The amount of pressure borne by the inner tube 44 is, in such instances, reduced by the amount of pressure applied in the annular space 48, which pressure is, of course, borne by the outer tube 46.

It is important to point out that the fluid introduced in the annular space 48 need not be dichloro-difluoro-methane but may take the form of any other suitable halogenated hydrocarbon, under which circumstances sensing may continue to be achieved by means of the apparatus 76. Moreover, other fluids may be used in conjunction with other sensing apparatus. For example, helium may be used in conjunction with a mass spectrometer.

Monitoring of the condition of the fluid in annular space 48 can also be achieved by the arrangements illustrated in FIGS. 4–5 and in FIG. 6. These figures disclose embodiments similar to the embodiment of FIGS. 1–3; and accordingly, like numerals have been used to designate like elements, the suffix letter "a" being employed to distinguish elements of the embodiment of FIGS. 4–5 and the suffix letter "b" being employed to distinguish those elements associated with the embodiment of FIG. 6.

Referring particularly to the embodiment of FIGS. 4–5, the block 60a will be seen provided with a radial bore 80 opening into channel 52a and terminating in a tapped aperture 82. A pressure gage 84 is threadedly connected in aperture 82; and as will become apparent, when the space 48a is evacuated or is charged with a fluid under superatmospheric pressure, the vacuum or pressure will register on the gage 84 thereby providing a constant visual indication of the condition of the fluid within the space 48a.

In the embodiment of FIGS. 4–5, the pressure exerted by the fluid in the space 48a is advantageously arranged to be less than the pressure of the media flowing through the piping system. Hence, decrease in pressure as indicated by gage 84 would indicate failure of the outer flexible tube 46a whereas a rise in pressure in the space 48a as sensed by the gage 84 would indicate failure of the inner tube 44.

Turning to FIG. 6, a flexible connector 10b will be seen arranged with interply region or space 48b permanently connected to a source of fluid under pressure as by means of a capillary tube 86. This arrangement of the flexible connector recognizes the inherent low volume of fluid in the space 48 and insures the existence of sufficient fluid in this region for accurate sensing of failures. Moreover, this latter arrangement of the flexible connector permits a selective variation of the amount of pressure exerted by the fluid within the space 48b and, accordingly, allows selective variation of the pressure stresses taken up by the respective flexible tubes 44b and 46b.

While particular embodiments of the invention have been shown, it should be understood, of course, that the invention is not limited thereto since many modifications may be made; and it is, therefore, contemplated to cover by the appended claims any such modifications as fall within the true spirit and scope of the invention.

The invention is claimed as follows:

1. A flexible connector comprising: first annular end flange means; second annular end flange means spaced apart from said first annular end flange means; flexible tubing means fixed between said end flange means, including a first flexible, corrugated tube and a second flexible, corrugated tube disposed in coaxial relationship with said first tube, the corrugations of said second tube being radially aligned with the corrugations of said first tube in partially interfitting relationship therewith whereby closely to space said tubes; joint means connecting the respective ends of said first and second flexible tubes to define a closed annular space therebetween; one of said end flange means having a passageway affording communication with the annular space within the adjacent joint means; an internally recessed block mounted on said one end flange means in communication with said passageway and having an externally accessible sealed conduit to the block recess; fluid permanently filled into said space to a superatmospheric pressure through said conduit, block recess and passageway before the conduit is sealed; and a pressure gauge attached to the block for communication with the annular space for indicating change of pressure therein.

2. A flexible connector comprising: first annular end flange means; second annular end flange means spaced apart from said first annular end flange means; flexible tubing means fixed between said end flange means, including a first flexible, corrugated tube and a second flexible, corrugated tube disposed in coaxial relationship with said first tube, the corrugations of said second tube being radially aligned with the corrugations of said first tube in partially interfitting relationship therewith whereby closely to space said tubes; joint means connecting the respective ends of said first and second flexible tubes to define a closed annular space therebetween; one of said end flange means having a passageway affording communication with the annular space within the adjacent joint means; an internally recessed block mounted on said one end flange means in communication with said passageway and having an externally accessible sealed conduit to the block recess; a volatile, detachable fluid substance permanently filled into said space through said conduit, block recess and passageway before the conduit is sealed; and means for sensing the presence of said substance externally and internally of said flexible tubing means.

References Cited by the Examiner

UNITED STATES PATENTS

| | | | |
|---|---|---|---|
| 1,577,968 | 3/1926 | Hemmingsen | 285—93 |
| 1,693,737 | 12/1928 | Weldon | 73—40.5 |
| 2,014,355 | 9/1935 | Hussman | 285—45 |
| 2,305,644 | 12/1942 | Stone | 285—114 |
| 2,460,238 | 1/1949 | Penick. | |
| 2,550,498 | 4/1951 | Rice | 73—40.7 |
| 2,885,248 | 5/1959 | White. | |
| 2,898,940 | 8/1959 | Cole | 285—114 |
| 2,969,247 | 1/1961 | Eggman | 285—114 |
| 3,004,779 | 10/1961 | Cullen et al. | 285—149 |
| 3,029,094 | 4/1962 | Parlasca et al. | 285—114 |
| 3,087,745 | 4/1963 | Rumbell. | |

FOREIGN PATENTS

| | | |
|---|---|---|
| 594,620 | 11/1947 | Great Britain. |
| 759,306 | 11/1956 | Great Britain. |
| 836,209 | 11/1956 | Great Britain. |

CARL W. TOMLIN, *Primary Examiner.*